(12) United States Patent
Müller

(10) Patent No.: US 6,380,481 B1
(45) Date of Patent: Apr. 30, 2002

(54) METHOD AND APPARATUS FOR SUPPLYING SOLAR ENERGY FOR OPERATION OF A VEHICLE

(76) Inventor: Hermann-Frank Müller, Lyngsbergtrase 3e, D-53177 Bonn (Bad Godesberg) (DE)

( * ) Notice: Subject to any disclaimer, the term of this patent is extended or adjusted under 35 U.S.C. 154(b) by 0 days.

(21) Appl. No.: 09/585,436

(22) Filed: May 31, 2000

(51) Int. Cl.[7] .................. H01L 31/045; B60K 16/00
(52) U.S. Cl. .................. 136/291; 136/245; 136/244; 280/65.3; 280/2.2; 280/89.12; 280/311; 280/491.1; 123/2
(58) Field of Search ................... 136/291, 245, 136/244; 180/65.3, 2.2, 89.12, 311, 491.1; 123/1 A, 2

(56) References Cited

U.S. PATENT DOCUMENTS

| | | | | |
|---|---|---|---|---|
| 4,633,767 A | * | 1/1987 | Sain | 136/291 |
| 4,636,579 A | * | 1/1987 | Hanak et al. | 136/291 |
| 5,433,259 A | * | 7/1995 | Faludy | 136/291 |
| 5,647,916 A | * | 7/1997 | Guazzoni | 136/253 |
| 5,771,946 A | * | 6/1998 | Kooy et al. | 141/82 |

FOREIGN PATENT DOCUMENTS

| | | | |
|---|---|---|---|
| DE | 4409086 A1 | * | 11/1995 |
| EP | 0788908 A2 | * | 8/1997 |
| GB | 2317445 A | * | 3/1998 |

* cited by examiner

*Primary Examiner*—Alan Diamond
(74) *Attorney, Agent, or Firm*—R. W. Becker & Associates; R. W. Becker

(57) ABSTRACT

A tractor and trailer combination, the trailer having a cover for covering a load support surface thereof and a frame assembly is provided which includes a roller and a plurality of solar cell lengths for extending along the cover, the solar cell lengths being movably connected to one another for rolling up of the solar cell lengths about the roller and the roller being removably rotatably mounted relative to the frame assembly. The tractor and trailer combination is a type of vehicle having a planar surface for protectively covering a load carrying surface of the vehicle and collectively flexible solar cell lengths disposable as the outwardly facing side of the planar surface which may additionally include a gas motor fueled by cryogenic fuel, a climate control arrangement supplied with the cryogenic fuel, and a solar thermal energy system for cooling operations.

26 Claims, 1 Drawing Sheet

METHOD AND APPARATUS FOR SUPPLYING SOLAR ENERGY FOR OPERATION OF A VEHICLE

BACKGROUND OF THE INVENTION

The present invention relates to a method and apparatus for supplying solar energy for operation of a vehicle. One aspect of the present invention relates to a prime mover tractor operable to pull a trailer in a semi-trailer arrangement and being of the type having a cover for covering the load carrying portion.

Prime mover tractors operable to pull a trailer, especially those involved in short haul transport, are available in different sizes and are adapted for the transport of differing types of goods, whereby a climate control arrangement for the cab of the tractor must sometimes be supported by a climate or cooling control arrangement provided for the transported goods. The energy required for such purposes engenders the need for energy storage (batteries) which during long hauls must be recharged or, respectively, exchanged for charged batteries or a generator driven by the motor must be provided, which itself uses additional operational energy and reduces the space available for the transported goods.

SUMMARY OF THE INVENTION

It is therefore an object of the present invention to provide the cover for covering the load carrying portion of a goods transporter with solar cell lengths which can be collectively flexed and which are trainable, or can be rolled, around a shaft which itself is removably rotatably supported on a frame assembly above the load carrying portion.

In accordance with one aspect of the present invention, there is provided a tractor and trailer combination, the trailer having a cover for covering a load support surface thereof and a frame assembly, comprising a roller; and a plurality of solar cell lengths for extending along the cover, the solar cell lengths being movably connected to one another for rolling up of the solar cell lengths about the roller and the roller being removably rotatably mounted relative to the frame assembly.

In accordance with further details of this aspect of the present invention, the roller is disposed on the top of the tractor. Also, the roller can be disposed on the top of the trailer.

Furthermore, the roller is disposed on a selected one of the interior and exterior of a wind deflector. Additionally, the cover is comprised of a plurality of cover portions, each cover portion for covering a selected one of the sides and the top of the trailer. Preferably, the roller is associated with one of the cover portions and further comprising a plurality of rollers each associated with a respective one of the cover portions.

In accordance with yet more details of the present invention, each cover portion is mounted to the frame assembly. Also, the tractor and trailer combination further comprises means for manually extending and retracting the cover and a motor for extending and retracting the cover. Preferably, at least one roller is lockably mountable in the frame assembly.

Furthermore, the tractor and trailer combination preferably comprises a swing arm on which the at least one roller is mountable, at least one of a motor for rotatably driving the roller, and an energy storage means for storing energy collected by the solar cell lengths. Additionally, the tractor and trailer combination preferably comprises means forming a reservoir for storing a fluid which can be drawn thereout to clean the outer surface of the cover, the means forming a reservoir being mountable in a selected one of the frame assembly and the roller.

In accordance with yet further details of the one aspect of the present invention, the solar cell lengths are connected to one another in a water proof and detachable manner. Also, the solar cell lengths include a protective coating adapted to not substantially impede the collection of solar energy, to discourage the deposition of dirt thereon, and to reduce wear by rubbing effects.

Moreover, the tractor and trailer combination of the one aspect of the present invention preferably also comprises a deck portion for extending over the top of the roller and an apparatus mounted to the frame assembly for applying a cleaning fluid to the outer surface of the cover. Additionally, the tractor and trailer combination preferably comprises a climate control assembly mounted to the tractor and coupled to the solar cell lengths for receiving energy supply therefrom. A cooling assembly is preferably mounted to the tractor and coupled to the solar cell lengths for receiving energy supply therefrom.

In accordance with yet further additional details of the one aspect of the present invention, the trailer is configured with a cooling area partitioned by walls into a plurality of zones of differing temperatures. The partitioning walls include insulation and heat exchange areas.

Moreover, the tractor and trailer combination preferably comprises a wind driven wheel operable to convert wind energy into another form of energy and an apparatus operable to convert braking energy generated by braking of the tractor and trailer combination into another form of energy. The apparatus operable to convert braking energy generated by braking of the tractor and trailer combination into another form of energy converts the braking energy into stored electrical energy.

The tractor and trailer combination of the one aspect of the present invention preferably additionally includes an apparatus for collecting solar energy by means other than conversion of sunlight into another form of energy. Also, the tractor includes a cab in which the driver is located and means for controlling the deployment of the solar cell lengths from the cab. Moreover, the tractor and trailer combination preferably includes electrolytic hydrogen means for storing energy.

In accordance with another aspect of the present invention, there is provided a vehicle having a planar surface for protectively covering a load carrying surface of the vehicle and collectively flexible solar cell lengths disposable on or as the outwardly facing side of the planar surface comprising a gas motor fueled by cryogenic fuel, a climate control arrangement supplied with the cryogenic fuel, and a solar thermal energy system for cooling operations.

In accordance with further details of this aspect of the present invention, the cryogenic fuel is methane. Also, the vehicle preferably includes an enclosure for commonly retaining the cryogenic fuel for the gas motor and the climate control arrangement. The enclosure includes a partition wall for partitioning the enclosure into at least two regions one of which is disposed relatively deeper than the other, the relatively deeper region being adapted for retaining therein the cryogenic fuel for the climate control arrangement and the other region being adapted for retaining therein the cryogenic fuel for the gas motor. Also, the enclosure includes a one way valve mounted in the partition wall for permitting flow only into the relatively deeper region of the enclosure which retains the cryogenic fuel for the climate control arrangement.

Preferably, the one way valve is actuatable by a selected one of manual actuation and sensor actuation. Also, the solar thermal energy system is preferably configured as an open adsorption system in which air is directly introduced as a cooling medium in a desiccant cooling process. The solar thermal energy system includes a selected one of amorphous silicate and lithium chloride as a drying agent.

According to yet other details of this aspect of the present invention, the solar cell lengths include channels disposed along their back sides for conducting therethrough a selected combination of gaseous, liquid, and gaseous and liquid fluid. Also, the vehicle may include a rotatable disc configured for storing energy and means for converting braking energy to kinetic energy. Moreover, the vehicle may include at least one of a high performance condenser and a nickel-metal hydride battery operable as an energy storage means and means for applying rotational movement to a tire of the vehicle, the means for applying rotational movement being connected to the solar cell lengths for receiving energy therefrom. Additionally, the vehicle may include a remote actuator for remotely actuating the supply of energy from the solar cells lengths.

DETAILED DESCRIPTION OF THE PREFERRED EMBODIMENT

Figure 1:
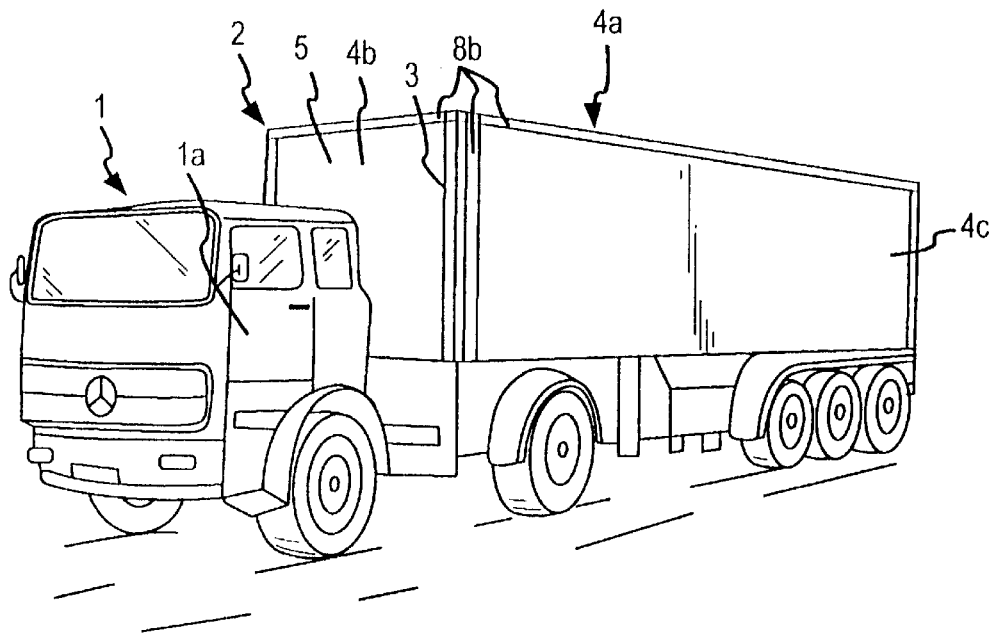
FIG. 1 is a perspective view of a tractor and trailer combination of the present invention.
Figure 3:
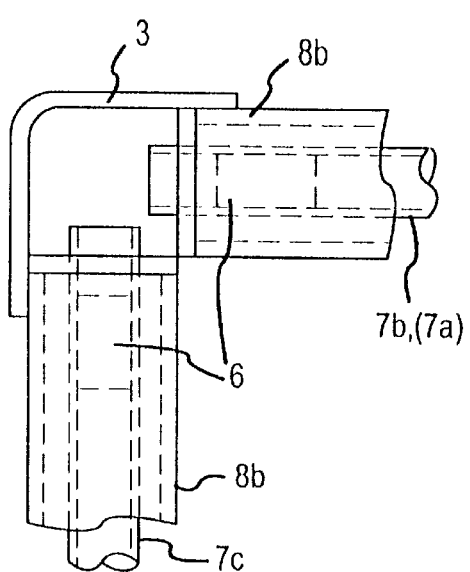
FIG. 3 is an enlarged plan view, in partial section, of a portion of two covers with the associated rollers.

As seen in FIG. 1, a prime mover tractor 1 is shown with a trailer 2 coupled thereto to form collectively a semi trailer arrangement. The load carrying surface of the trailer 2 is provided with a frame assembly 3 which is covered by at least one cover 4. The cover 4 can be a single piece item if, for example, only one longitudinal side or only the top is to be covered by the cover. On the other hand, if both longitudinal sides and lateral sides, as well as the top, are to be covered, it is advisable to configure the cover 4 of a plurality of portions so as to thereby simplify and facilitate the covering operation. To this end, for example, it is advisable to provide a cover 4a for the top, a front lateral cover 4b for the front lateral side, and a longitudinal cover 4c for each respective longitudinal side. The side covers can be arranged vertically (see FIG. 1) or horizontally as dictated by need.

Collectively flexible solar cell lengths 5 are mounted on the surfaces of the covers 4a, 4b, and 4c to exploit the energy gathering potential offered thereby. The energy thus collected in the solar cell lengths 5 is conducted in a known manner via cable, printed circuits, or other arrangements to at least one energy storage means 6 which is provided in the available space of the rollers 7a, 7b, and 7c that are provided for roll up storage of the covers 4a, 4b, and 4c. The energy storage means 6 can be configured as, for example, batteries or high performance condensers. It is possible to connect the solar cell lengths 5 to one another in a waterproof and detachable manner. An alternative configuration which may be recommended for an assemblage of solar cell lengths 5 in a cover portion intended to replace a conventional cover portion is a beneficial water repelling protective coating which nonetheless does not impede solar energy collection while offering only a negligible foothold for dirt and, additionally, at least minimizing the wear effect caused by rubbing. In view of the fact that the solar cell lengths 5 are detachably connected to one another, an eventual exchange is possible of a solar cell length for another one in the event, for example, of damage to the solar cell length which is to be replaced.

Figure 2:
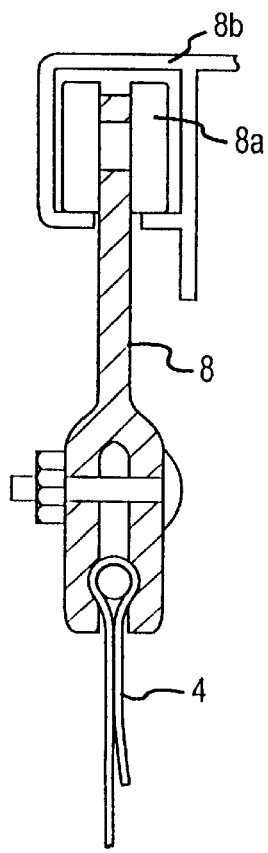
FIG. 2 is an enlarged plan view, in partial section, of a portion of the solar cell lengths and the frame assembly of the tractor and trailer combination shown in FIG. 1.

In order that the covers 4a, 4b, and 4c can be easily rolled out, their edges extending in the unrolling direction can be provided, for example, with clamp elements 8 (see FIG. 2) which have on their free ends a roll wheel 8a operable to roll along a track 8b provided in the frame assembly 3. In this manner, the track 8b can comprise a portion which extends through slots in the frame assembly 3 and other portions at right angles thereto which are coupled in a preferred manner, such as, for example, in a removable manner, with the frame assembly.

The rolling out of the covers 4a, 4b, and 4c from, and the rolling up of the covers 4a, 4b, and 4c onto, the rollers 7a, 7b, and 7c can be accomplished in a manual manner such as, for example, by means of a crank, or can be accomplished by a motor, which is disposed in the available space of a roller 7 and whose operation can be controlled from the cab 1a of the tractor 1. In this connection, it is advisable that the free end of the respective cover 4a, 4b, or 4c be coupled to its associated roller 7a, 7b, or 7c by means of a chain or cable-pull, which itself is trained around a roll up element. The roll up element is mounted on an end of the respective roller 7 remote from the track 8b and can be, for example, in the form of a gear or a roller. In this manner, a balanced rolling out or rolling up of the respective cover is ensured.

The rollers 7a, 7b, and 7c of the individual covers 4a, 4b, and 4c are mountable in retainers of the frame assembly 3 in any desired conventional manner and are adjustable so that, on the one hand, if there is a need for exchanging an entire cover 4a, 4b, or 4c due to, for example, extensive damage, that exchanged portion can be used for energy collection and supply apart from the tractor 1 while, on the other hand, unauthorized removal of a roller 7 from its rotation mounting or inadvertent uncoupling thereof due to road vibration is prevented by a lockable and, if desired, adjustable, mounting arrangement. In the event of a (permitted) removal of a roller 7a, 7b, or 7c with its associated cover 4a, 4b, or 4c, the chain or cable-pull needs to be released in a known manner from its coupling with the roller and the cover.

It is possible also to provide the mounting arrangement of each roller 7 on a swing arm which is swingably mounted to the frame assembly 3 and can be operated—manually or, for example, hydraulically as controlled via the cab 1a—to easily swing, in spite of its considerable weight, the roller 7a, 7b, or 7c with its associated cover 4a, 4b, or 4c away from the trailer 1 to a transport vehicle or a container.

A cleaning apparatus can be provided in an overdeck element extending over a roller 7 having a cover 4 rolled up thereon which is operable to clean the cover 4 or the solar cell lengths 5. The cleaning apparatus could include water jets, brushes, and other suitable implements. The water used in the cleaning of a cover 4 can be pumped from reservoirs which can be mounted in the available spaces of the frame assembly 3 or the rollers 7. Water from the climate control assembly or from water conductors can be used to supply the reservoirs. If the roller overdeck element is supplementarily configured as a water "gutter" communicating with a corresponding inlet in the reservoir, rain water can be used to supply the reservoir. In such a configuration, arrangements must be made for an overflow for dumping excess water exteriorly of the cover 4 such that the reservoir is filled only to an allowable maximum fill condition.

A climate control arrangement for the cab 1*a* of the tractor 1 is desirable for operation in warmer regions. Such an arrangement can be mounted on the backside of the cab 1*a* whereby the required energy is supplied via high performance capacitors (batteries) of the solar cell lengths 5.

Many types of goods to be transported require a suitable cooling environment during their transport. The size of the required cooling arrangement is dependent upon whether the transported goods are to be transported in suitable insulating containers or whether the entire space defined between the load supporting surface and the top of the trailer must be cooled. The insulation of this space is definitely called for in order to avoid a cooling arrangement of an unnecessarily large size. The partitioning of the total space to be cooled can be implemented, for example, in consideration of the necessary temperature range, whereby goods with a relatively high storage temperature are separated by vertical and/or horizontal insulating walls from goods with a relatively low storage temperature, with the insulation portions of such walls being divided into predetermined areas so that the pipes comprising the cooling circuit are sufficiently exposed to effect their heat transfer operations with the goods to be cooled. If, in this implementation, the goods with a relatively lower storage temperature are surrounded at least in part by the goods with a relatively higher storage temperature, then the total required cooling effort can be held to a minimum level. It is self evident that other advantageous storage configurations are possible for the respective circumstances and especially if only a portion of the space is to be used for the transport of goods to be cooled, whereby such goods can be protected by a correspondingly effective insulation arrangement. If all possible insulation arrangements are properly considered, the energy collected by the solar cell lengths 5 on the covers 4 can suffice to at least substantially cover the energy needs of the cooling areas without the need to draw energy from the tractor battery or from additional generators. The control of the cooling operation is advisedly done by an arrangement located in the cab 1*a*.

Supplemental energy can be obtained, if desired, from a wind driven wheel extending from the roof of the tractor 1 and/or from the frame assembly above the covers 4 and which is driven by the wind available while the tractor is being driven or is otherwise available when the tractor is stationary. In such a configuration, it is necessary to ensure a reliable mounting of the shaft of the wind driven wheel and protection thereof from rubbing or friction relative to its environment, especially as it extends through the cover 4.

Supplemental energy can further be derived from an apparatus for collecting energy from braking (see DE-OS 44 09 086) as well as from an apparatus with whose help energy from solar waves can be derived independent of sunlight (see U.S. Pat. No. 5,647,916).

The total energy derived from the solar cell lengths 5 can, in addition to supplying the energy needs of the designated storage area, be used to charge the tractor battery and can be supplied via an electrical plug to other users. To the extent that the trailer does not need a cover which can be selectively rolled out and rolled up, the trailer can be provided with a rigidly mounted cover which offers the advantage that a rigid monocrystal or polycrystal solar cell can be used which provides a performance which is a multiple of the performance afforded by a collectively flexible solar cell arrangement. This is of special significance for the implementation of large cold transport configurations as well as configurations with diesel-, hydrogen- and fluid-motors.

If an energy surplus is available which cannot be stored in the available energy storage elements, it is of advantage to use hydrogen as a current storage since electrolytic hydrogen can cost-effectively store a relatively large amount of electricity. The losses by conversion of energy into other energy forms are relatively low because the electrolytic circuit as well as the combustion cells which convert the hydrogen back into electrical current, operate with a relatively high efficiency.

It is thus noted that the tractor of the present invention is suitable not only for short haul applications but is equally adaptable to rail transport applications with the requisite alterations to the configurations to adapt the invention to that environment.

According to another aspect of the present invention, a vehicle, in particular, a tractor and trailer combination of the type commonly referred to as a semi-trailer combination, has a planar cover for covering the load supporting surface. The planar cover comprises or has thereon collectively flexible solar cell lengths which are rollable around a roller which itself is removably rotatably mounted to a frame assembly above the load carrying surface. A vehicle of this type is disclosed in DE 199 35 009, whether powered by diesel or gasoline fuel, both of which fuels are of the type which generate environmentally damaging exhaust gases.

During long haul stretches and, above all, during high ambient temperatures, the use of a climate control device, which can be controlled to the benefit of the vehicle occupants, is often a necessity. The energy needed for such a device can as a rule be generated from the solar cell lengths on the planar cover, so long as other energy consuming devices do not impose too high a demand for energy as well. Additional energy for maintaining low temperatures for transport goods of various properties and amount requiring cooling necessitate an enhanced arrangement with correspondingly more fuel usage.

It is a further object of the present invention to provide a vehicle which is operable with the lowest possible need for fuel which must be carried with the vehicle, whereby such fuel is an environmentally beneficial, emissions free, or emissions reduced fuel, and additional energy consuming sources can be supplied as well in cases of greater demand.

For meeting this challenge, it is not only foreseen that a gas motor will be used—not only a supplemental power source but as the drive source as well with the gas motor being fueled by cryogenic fuel which is a fuel which can at the same time be used in a cooling or climate control device, as described in EP 07 88 908 A2—but it is additionally contemplated that a solar thermal system will be used. The solar thermal system, which is solely dedicated to the climate control configuration, enables the usage of fuel to be reduced and can additionally supply energy to other energy consuming devices to the extent that such energy is not needed for the climate control configuration.

EP 07 88 908 A2 recommends liquid oxygen, liquid hydrogen, and liquid natural gas as the cryogenic fuel. However, methane can also be used. The selection of the type of fuel is dependent upon the particular fuel availability and fuel usage possibilities offered by the fuel supplier as well as the requirements of the fuel consumer. Cryogenic fuel generates much less ozone, carbon monoxide, nitrogen oxide, and hydrocarbons. A cold insulated tank of premium material is required to carry such fuel along with the vehicle. In the event that a common enclosure is used for both the drive fuel and the cooling circuit—which is preferable over two separate enclosures due to space saving and fuel supplying considerations—a separating wall is provided in the enclosure in order to ensure the adequacy of fuel available for the operation of the cooling or the climate control configuration. The deeper region created by the separating wall in the common enclosure is for the cooling circuit. A one way valve is provided in the separating wall which opens only in the direction of the deeper region in which the cooling circuit is situated and is actuatable manually or by means of a sensor. In this manner, it can be ensured that adequate fuel for the cooling circuit is always available in the deeper region so as to thereby avoid spoilage of the food and the like while the fuel level in the upper region available for the operation of the drive motor is monitored by a sensor whose sensing information can be displayed in the cab of the vehicle. The sensor display may be enhanced by an acoustic signal whose sound level and operational modes corresponding to the remaining level of fuel can be adjusted by the fuel supplier.

The discussion entitled "Offene solare Sorptionskuehling mit Luftkollektoren" authored by Dr. Ursula Eicker and Gerrit Hoefker in a publication by the Hochschule fuer Technik-Fachhochschule Stuttgart recommends sorption supported processes in connection with the use of thermal energy for the production of coolant. While absorption cooling machines work by means of a constriction in a thermal compressor instead of a mechanical compressor as used in a conventional compression cooling machine, an open adsorption cooling system (Desiccant Cooling System) introduces air directly as the cooling medium. The principle underlying a desiccant cooling process is based upon exploiting the useful differential increase between the moist and dry temperatures of the air and the resulting cooling through wetting of the air. The pre-drying of the outside air through sorption means is accomplished through the use of material such as amorphous silicate or lithium chloride at temperatures between 60–90 degrees C. as the drying medium in so-called sorption wheels, which are regenerative rotary heat exchangers coated with sorption medium.

For the special application of solar energy usage in low temperature ranges, cost favorable flat collectors can be used due to the low temperature level, whereby an even greater solar energy coverage can be achieved. The inlet air which has been pre-dried by the sorption wheel is fed to a conventional regenerative heat exchanger and is pre-cooled by surrounding air which has been wetted up to its saturation point. The inlet air can be cooled to the condensation point temperature by the air wetter in the inlet air feed. In the strong air feed of the configuration, the exhaust air which has been pre-heated by the regenerative heat exchanger is brought to the regenerative air temperature by the introduction of thermal (solar) energy. This regenerative air temperature level is necessary for the wet operation of the sorption medium. The portions of the inlet and exhaust air, as well as the respective requisite temperatures during the climate control operation, can be automatically regulated by means of sensor actuated air valves.

In order to maintain the solar cell lengths at maximum efficiency, it is necessary not only to provide them, as is known, with a protective coating which does not impede energy collection, discourages the deposition thereon of dirt, and reduces wear caused by a rubbing effect, but it is also necessary to provide, on the back side of the solar cell lengths, channels through which gaseous (for example, cold air) or liquid cooling medium flows.

It should not be left out of consideration that enhanced latent energy sources in addition to solar energy can be used to reduce the required drive fuel amount. In this regard, the braking energy, which can be stored, for example, via the drive shaft to a rotating disc or stored electrically, energy generated by a wind driven wheel, and other similar energy generators can be used.

Batteries of various configurations, high performance capacitors, nickel-metal-hydride batteries, and the like can be used to store the electrical energy.

In addition to the use of the inventive features and aspects in connection with prime mover tractors involved in street- and rail-transport, these inventive features and aspects can also be used in the operation of ships including their climate control operations which benefit from the reduction in the requisite fuel while such environments offer adequate surfaces for positioning the solar cell lengths thereon. In the case of a small vehicle such as, for example, an automobile or other non-commercial vehicle, the required effort by the consumer to obtain additional available energy must be determined beforehand, for example, for a cooler in the trunk or a deep cold chest in a camping van lacking a connection to a local electrical net and the extent to which fuel for a gas motor can be generated. For vehicles involved in local street traffic or on golf courses, environmental consciousness respecting clean and healthy air is a prominent aspect recommending the invention in the face of the financial burdens connected therewith, whereby the greatest possible surface for solar cell lengths may be enhanced as well by the use of an engine having reduced harmful emissions.

Significant difficulties can arise if the tractor pulls a trailer such as a camping trailer, for example, which must be situated, when in an uncoupled disposition, in the narrowmost spaces. In such instances, it is, as a rule, not possible for the trailer to be supplied from the battery of the tractor. In order then to not be dependent upon manual energy, actuation means can be provided which engages a tire on each side of the camping trailer in order to thereby drive it. The energy needed for this can be derived from energy storage means supplied by solar cell lengths on the camping trailer. A remote actuator can be used to control the operation.

At this point, Applicant would like to make reference to Superconducting Magnetic Energy Storage (SMES), which are prospective carriers for multiple utilization possibilities in electrical networks. For example, for local improvement and stabilization of the network quality, as well as for the optimum use of regenerative energy carriers having fluctuating (not uniform) performance. This can be used in conjunction with solar energy, wind energy and braking energy. Varying energy storage means can be disposed in series. Superconducting current limiters and/or SMES can be disposed between energy reservoirs and hydrogen energy reservoirs. Superconducting high tension cables can be used, for example, to convey the braking energy to the energy reservoir.

The specification incorporates by reference the disclosure of the German priority documents listed below:

| Document Number | Date Filed |
| --- | --- |
| 199 24 878.8 | May 31, 1999 |
| 199 25 136.3 | June 2, 1999 |
| 199 35 009.4 | July 26, 1999 |
| 199 35 557.3 | July 30, 1999 |
| 199 36 490.7 | August 5, 1999 |
| 199 49 001.5 | October 11, 1999 |

The present invention is, of course, in no way restricted to the specific disclosure of the specification and drawings, but also encompasses any modifications within the scope of the appended claims.

What is claimed is:

1. A tractor and trailer combination, the trailer having a cover for covering a load support surface thereof and a frame assembly, comprising:
    a roller; and
    a plurality of solar cell lengths for extending along the cover, the solar cell lengths being movably connected to one another for rolling up of the solar cell lengths about the roller and the roller being removably rotatably mounted relative to the frame assembly.

2. The tractor and trailer combination according to claim 1, wherein the roller is disposed on the top of the tractor.

3. The tractor and trailer combination according to claim 1, wherein the roller is disposed on the top of the trailer.

4. The tractor and trailer combination according to claim 1, wherein the roller is disposed on a selected one of the interior and exterior of a wind deflector.

5. The tractor and trailer combination according to claim 1, wherein the cover is comprised of a plurality of cover portions, each cover portion for covering a selected one of the sides and the top of the trailer.

6. The tractor and trailer combination according to claim 5, wherein the roller is associated with one of the cover portions and further comprising a plurality of rollers each associated with a respective one of the cover portions.

7. The tractor and trailer combination according to claim 5, wherein each cover portion is mounted to the frame assembly.

8. The tractor and trailer combination according to claim 1, and further comprising means for manually extending and retracting the cover.

9. The tractor and trailer combination according to claim 1, and further comprising a motor for extending and retracting the cover.

10. The tractor and trailer combination according to claim 6, wherein at least one roller is lockably mountable in the frame assembly.

11. The tractor and trailer combination according to claim 10, and further comprising a swing arm on which the at least one roller is mountable.

12. The tractor and trailer combination according to claim 1, and further comprising at least one of a motor for rotatably driving the roller and an energy storage means for storing energy collected by the solar cell lengths.

13. The tractor and trailer combination according to claim 1, and further comprising means forming a reservoir for storing a fluid which can be drawn thereout to clean the outer surface of the cover, the means forming a reservoir being mountable in a selected one of the frame assembly and the roller.

14. The tractor and trailer combination according to claim 1, wherein the solar cell lengths are connected to one another in a water proof and detachable manner.

15. The tractor and trailer combination according to claim 1, wherein the solar cell lengths include a protective coating adapted to not substantially impede the collection of solar energy, to discourage the deposition of dirt thereon, and to reduce wear by rubbing effects.

16. The tractor and trailer combination according to claim 1, and further comprising a deck portion for extending over the top of the roller and an apparatus mounted to the frame assembly for applying a cleaning fluid to the outer surface of the cover.

17. The tractor and trailer combination according to claim 1, and further comprising a climate control assembly mounted to the tractor and coupled to the solar cell lengths for receiving energy supply therefrom.

18. The tractor and trailer combination according to claim 1, and further comprising a cooling assembly mounted to the tractor and coupled to the solar cell lengths for receiving energy supply therefrom.

19. The tractor and trailer combination according to claim 1, wherein the trailer is configured with a cooling area partitioned by walls into a plurality of zones of differing temperature regimes.

20. The tractor and trailer combination according to claim 19, the partitioning walls including insulation and heat exchange areas.

21. The tractor and trailer combination according to claim 1, and further comprising a wind driven wheel operable to convert wind energy into another form of energy.

22. The tractor and trailer combination according to claim 1, and further comprising an apparatus operable to convert braking energy generated by braking of the tractor and trailer combination into another form of energy.

23. The tractor and trailer combination according to claim 22, wherein the apparatus operable to convert braking energy generated by braking of the tractor and trailer combination into another form of energy converts the braking energy into stored electrical energy.

24. The tractor and trailer combination according to claim 1, and further comprising an apparatus for collecting solar energy by means other than conversion of sunlight into another form of energy.

25. The tractor and trailer combination according to claim 1, wherein the tractor includes a cab in which the driver is located and means for controlling the deployment of the solar cell lengths from the cab.

26. The tractor and trailer combination according to claim 1, and further comprising electrolytic hydrogen means for storing energy.

\* \* \* \* \*